United States Patent [19]

Todeschini et al.

[11] 4,129,192

[45] Dec. 12, 1978

[54] HYDROSTATIC TRANSMISSIONS

[75] Inventors: Eugenio Todeschini, Latina; Gian P. Riganti, Anzio, both of Italy

[73] Assignee: Massey-Ferguson Services N.V., Curacao, Netherlands Antilles

[21] Appl. No.: 797,727

[22] Filed: May 17, 1977

[30] Foreign Application Priority Data

May 20, 1976 [GB] United Kingdom ............... 20825/76

[51] Int. Cl.² ............................................. B62D 11/04
[52] U.S. Cl. ..................................... 180/6.48; 60/486; 60/DIG. 10; 417/426
[58] Field of Search ................. 180/6.48; 60/486, 485, 60/DIG. 10; 91/505; 417/454, 539, 426

[56] References Cited

U.S. PATENT DOCUMENTS

| 2,359,758 | 10/1944 | Hamren | 180/6.48 |
| 2,791,284 | 5/1957 | Jackson | 180/6.48 |
| 3,025,673 | 3/1962 | Brown et al. | 180/6.48 X |
| 3,903,978 | 9/1975 | Kraus | 180/6.48 |

*Primary Examiner*—John A. Pekar
*Attorney, Agent, or Firm*—W. R. Nolte

[57] ABSTRACT

In a crawler having a rear housing or frame a pair of hydrostatic transmission pumps are mounted back-to-back and interconnected by a manifold which acts as a mounting for the pumps on to the rear housing. One pump is located within the rear housing and the other pump is outside.

3 Claims, 7 Drawing Figures

HYDROSTATIC TRANSMISSIONS

This invention relates to hydrostatic transmissions and in particular to such transmissions as installed in crawler vehicles.

Hydrostatic transmission used on crawler vehicles comprise a pair of pumps and a pair of motors, hydraulically connected in pairs and each motor driving one track of the vehicle.

Known transmissions have employed a splitter gear box mounted on the rear of the engine to provide drives to the pumps. The pumps, which are usually mounted integrally with the gear box, in side by side relationship, are connected to their respective motors by flexible hoses. Such hoses are expensive and require considerable care in fitting. Further such hoses are vulnerable to physical damage when used in earthworking vehicles due to the arduous conditions in which such vehicles are used.

It is an object of the present invention to obviate or mitigate the above disadvantages.

According to the present invention there is provided a vehicle having a pair of ground engaging drive means, a prime mover, a hydrostatic transmission interconnecting said prime mover and each said ground engaging drive means, a housing supporting said transmission, said transmission comprising a pair of pumps having aligned longitudinal axes and mounted on opposite faces of a manifold, a pair of motors, and conduit means hydraulically connecting said pumps and said motors and including passageways in said manifold, said manifold being mounted on said housing and said motors being mounted within said housing.

Preferably said housing is provided with an aperture and one of said pumps passes through said aperture upon mounting said manifold on said housing.

Preferably also said manifold covers said aperture.

Preferably said conduit means further includes rigid pipes extending from said manifold to additional manifolds mounted on said motors.

Embodiments of the present invention will now be described by way of example only with reference to the accompanying drawings in which.

Figure 1:
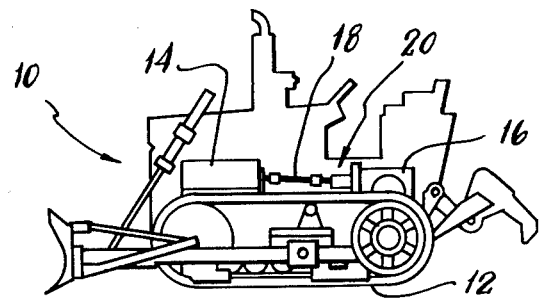
FIG. 1 is a side view of a crawler vehicle.
Figure 3:
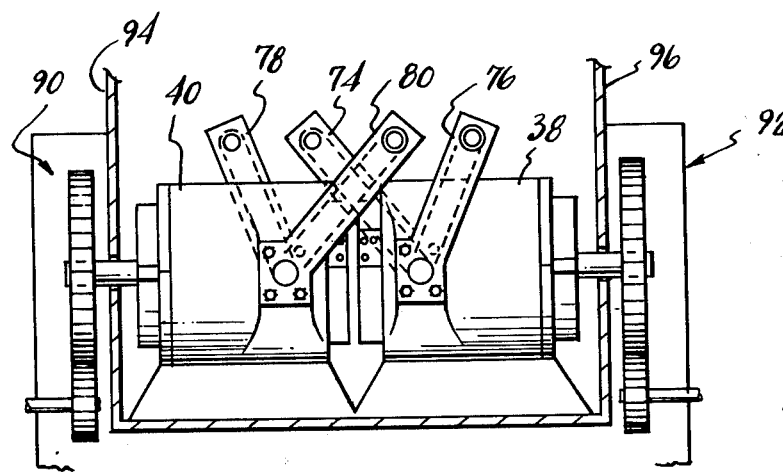
FIG. 3 is a view in the direction of arrow III of FIG. 2.
Figure 4:
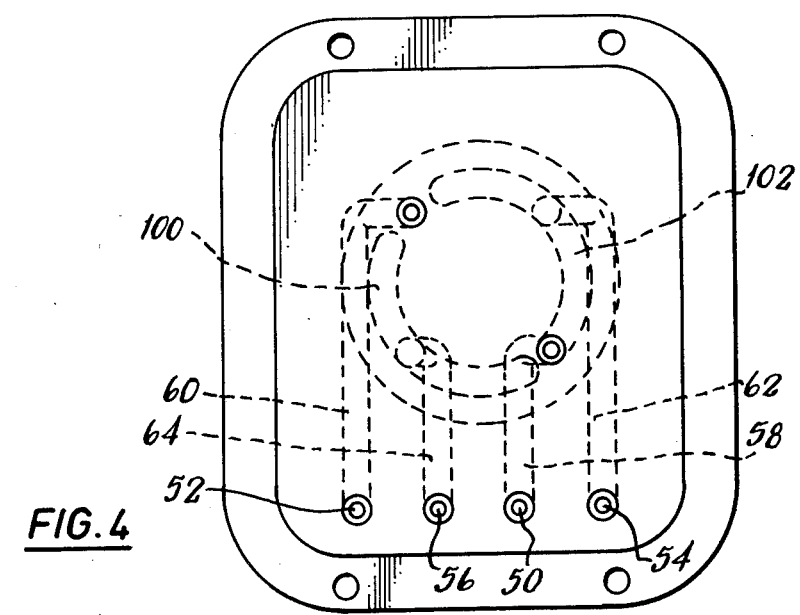
FIG. 4 is a detail view taken along the line IV—IV of FIG. 2.
Figure 2:
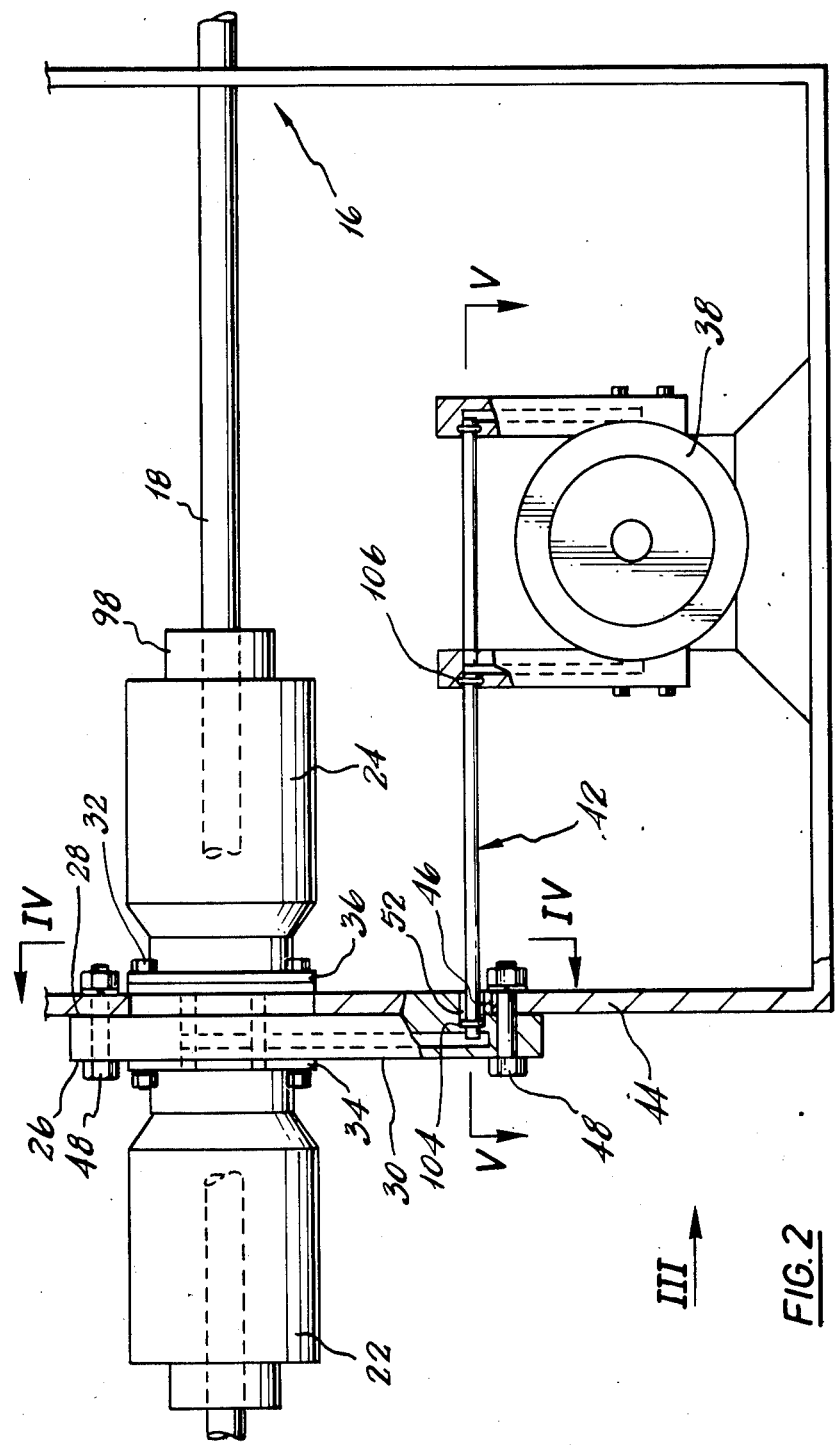
FIG. 2 is a sectional side elevation showing details of the installation of the transmission.
Figure 5:
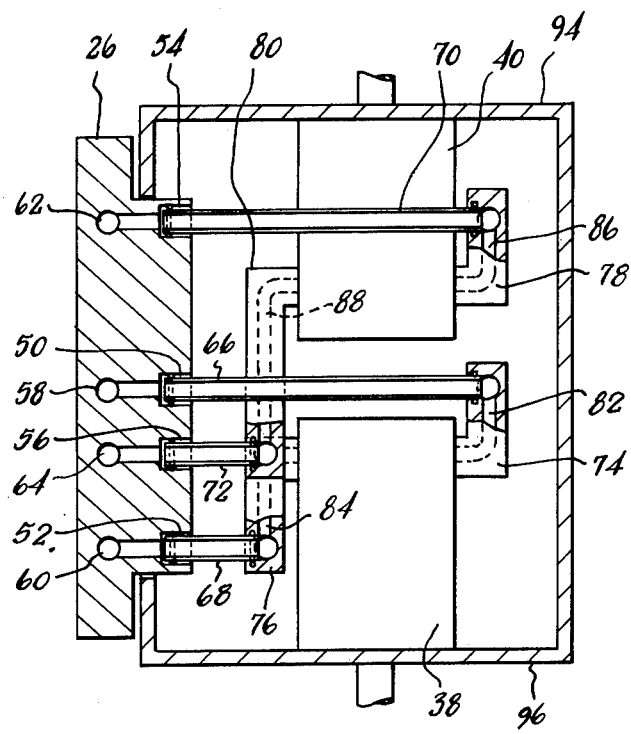
FIG. 5 is a plan view in the direction of arrow V of FIG. 2.

Referring now to FIG. 1, a crawler vehicle 10 has a pair of ground engaging drive means namely the tracks 12, an engine 14 and a housing 16. A driveshaft 18 connects the engine 14 with a transmission 20 which is best seen in FIGS. 2 and 3.

The transmission 20 comprises a pair of pumps 22, 24 which are mounted on opposite faces 26, 28 of a manifold 30, a pair of motors 38, 40, and conduit means 42 interconnecting the pumps 24, 26 and motors 38, 40. The pumps 22, 24 are secured to the manifold 30 by bolts 32 cooperating with slotted flanges 34, 36 respectively.

The front wall 44 of the housing 16 has an aperture 46 over which the manifold 30 is placed and secured by bolts 48. The lower end of the manifold has four shouldered holes 50, 52, 54, 56 which connect with passages 58, 60, 62, 64 respectively in the manifold.

Four solid pipes 66, 68, 70, 72, extend from the manifold 30, one pipe from each of the shouldered holes 50 to 56. Each pipe connects with a secondary manifold 74, 76, 78, 80, which are connected to the motors 38, 40 in pairs, the manifolds 74, 76 being connected to the motor 38, and the manifolds 78, 80 being connected to the motor 40. The secondary manifolds 74 to 80 are connected to the motors 38, 40 to cover the fluid inlets and outlets to the motors 38, 40 and are provided with internal passages 82, 84, 86, 88 which are hydraulically connected with respective ones of the pipes 66 to 72.

Each of the secondary manifolds 74 to 80 is inclined to the vertical to present a V formation so that each pipe 66 to 72 has unimpeded access to the secondary manifolds 74 to 80.

The motors 38, 40 drive the tracks 12 through reduction gearing 90, 92 arranged on the side walls 94, 96 of the housing 16.

The pumps 22, 24 are driven by the driveshaft 18 which passes through both the pumps 22, 24 and extends across the housing 16 to provide a power take off shaft. A charge pump 98 is mounted on the rear of the pump 24. Each pump 22, 24 has a pair of fluid ducts which terminate in a pair of kidney shaped ports 100, 102. The port 100 associated with pump 22 communicates with passage 64 and port 102 associated with pump 22 communicates with passage 62. Similarly, although not shown, the ports associated with pump 24 communicate with passages 58, 60 respectively.

The pipes 66 to 70 are sealed within the manifolds by O-rings 104, 106 and are axially located by the shoulders in the holes 50 to 56 and in the internal passages 82 to 88.

It will be seen that by mounting pumps 22, 24 on opposite faces of the manifold 30 a compact arrangement of the transmission is obtained. Further, by providing passages in the manifold it is possible to use a simple arrangement of rigid pipes between pump and motor without complicated fittings.

If convenient, the manifold 30 may house hydraulic valves for interconnecting the internal passages or venting them to a sump which may conveniently be provided by the housing 16.

Figure 6:
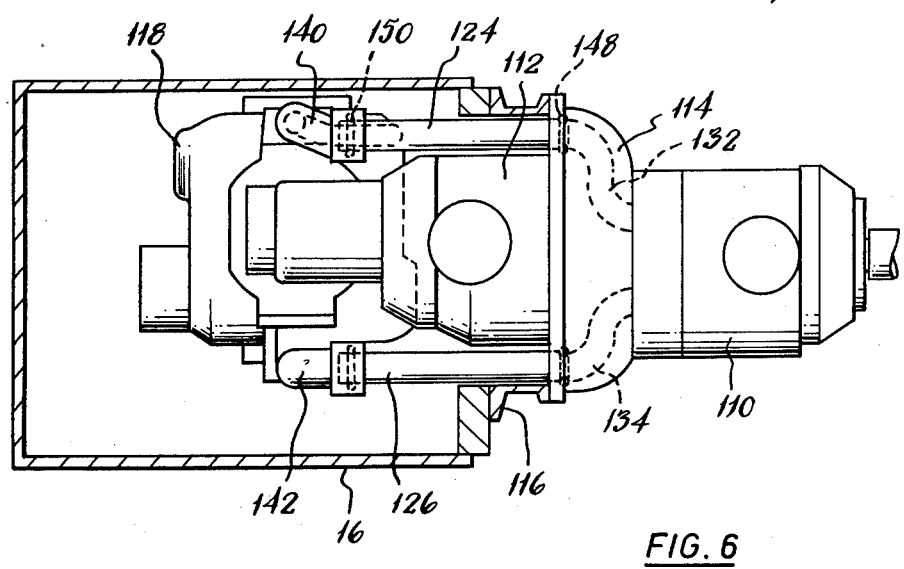
FIG. 6 is a side elevation of a further embodiment, one motor and its associated conduits being removed for clarity.
Figure 7:
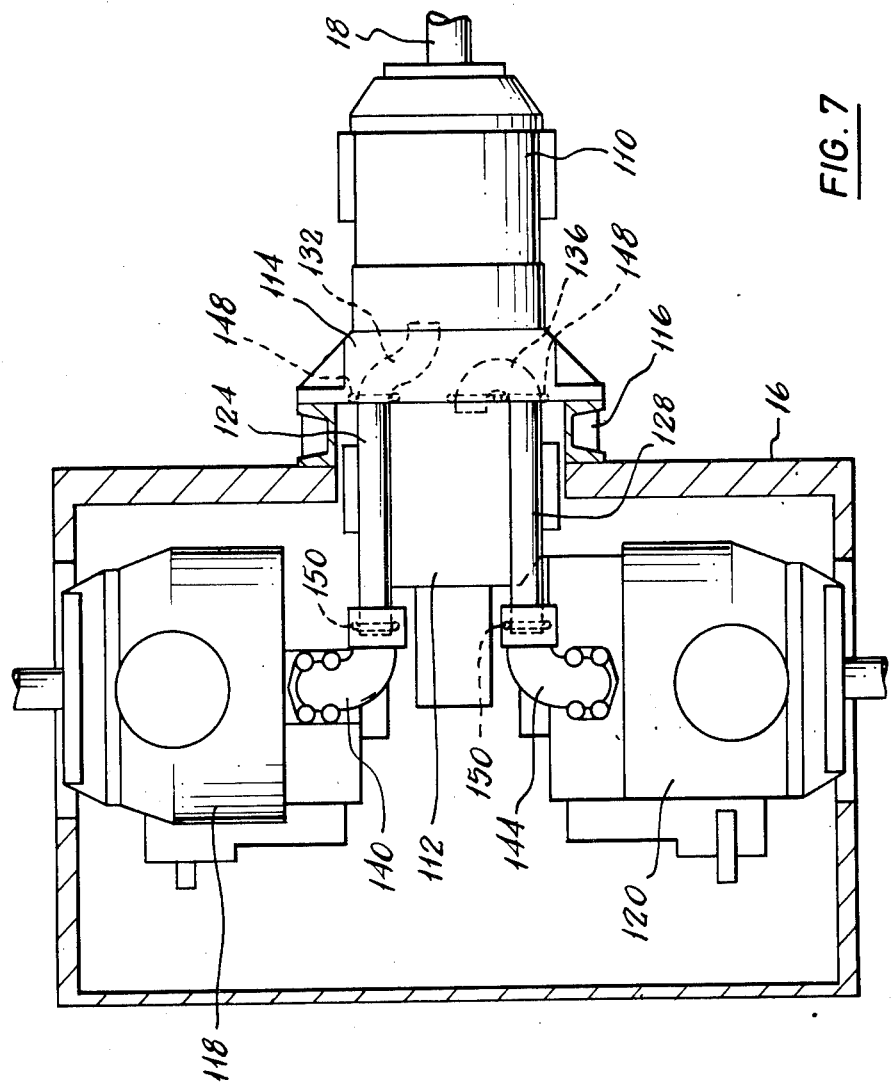
FIG. 7 is a plan view of FIG. 6.

In the embodiments shown in FIGS. 6 and 7 the pipes connecting the manifold and motors are arranged around the periphery of the manifold. The drive shaft 18 drives a pair of pumps 110, 112 mounted on opposite sides of a manifold 114. The manifold 114 is connected to a spacer 116 which is itself bolted on the housing 16. A pair of motors 118, 120 are arranged transversly in the housing 16 and each is hydraulically connected to a pump by conduit means 122.

The conduit means 122 includes pipes 124, 126, 128, 130 and passageways 132, 134, 136, 138 in the manifold 114.

The passage 132 is connected to the pipe 124 which in turn is connected to a secondary manifold 140 on the motor 118. Similarly the passage 134 is connected by pipe 126 to a further secondary manifold 142 on the motor 118. The passage 132, 134 respectively are connected to a pair of fluid ducts in the pump 110 which is a conventional variable capacity reversible swashplate pump. The manifolds 140, 142 are similarly connected to a pair of fluid ducts on the motor 118 so that fluid delivered by the pump 110 passes through the passage 132 or 134 pipe 124 or 126 and manifold 140 or 142 to the motor 118. Return flow from the motor to the pump takes the alternative route.

The pump 112 is connected to the motor 120 in a similar manner by passages 136, 138 pipes 128, 130 and a pair of secondary manifolds 144, 146.

The pipes 124 to 130 are sealed within the manifolds 114 and 140 to 146 by O-rings 148, 150 and are axially located by shoulders with the manifolds.

The arrangement of the pipes around the periphery of the manifold simplifies the manufacture thereof, reduces the length of the conduits and therefore improves the overall efficiency of the transmission and results in a more compact arrangement.

What we claim is:

1. A vehicle having a pair of ground engaging drive means, a prime mover, a hydrostatic transmission interconnecting said prime mover and each said ground engaging drive means, a housing supporting said transmission, said transmission comprising a pair of pumps having aligned longitudinal axes and mounted on opposite faces of a manifold, a pair of motors, and conduit means hydraulically connecting said pumps and said motors and including passageways in said manifold, a face on said manifold providing a flange connection mounting said manifold on said housing which has an aperture through which one of said pumps passes and over a portion of which said manifold face overlaps for the flange connection, said manifold providing the support on said housing for said pumps and said motors being mounted within said housing.

2. A vehicle according to claim 1 wherein said manifold covers said aperture.

3. A vehicle according to claim 1 wherein said conduit means further includes rigid pipes extending from said manifold to additional manifolds mounted on said motors.

* * * * *